US008117848B2

(12) United States Patent
Liebmann et al.

(10) Patent No.: US 8,117,848 B2
(45) Date of Patent: Feb. 21, 2012

(54) TEMPERATURE CALIBRATION DEVICE HAVING RECONFIGURABLE HEATING/COOLING MODULES TO PROVIDE WIDE TEMPERATURE RANGE

(75) Inventors: Frank E. Liebmann, American Fork, UT (US); David W. Farley, Orem, UT (US); Richard W. Walker, Alpine, UT (US); Michael W. Hirst, Lindon, UT (US); Allen E. Sjogren, Park City, UT (US)

(73) Assignee: Fluke Corporation, Everett, WA (US)

( * ) Notice: Subject to any disclaimer, the term of this patent is extended or adjusted under 35 U.S.C. 154(b) by 170 days.

(21) Appl. No.: 12/606,023

(22) Filed: Oct. 26, 2009

(65) Prior Publication Data
US 2010/0037626 A1   Feb. 18, 2010

Related U.S. Application Data

(63) Continuation of application No. 11/453,713, filed on Jun. 14, 2006, now Pat. No. 7,607,309.

(51) Int. Cl.
*F25B 21/02* (2006.01)

(52) U.S. Cl. .............................................. 62/3.3; 62/3.7

(58) Field of Classification Search .................... 62/3.3, 62/3.6, 3.7, 259.2
See application file for complete search history.

(56) References Cited

U.S. PATENT DOCUMENTS

| 5,544,487 A | 8/1996 | Attey et al. ..................... 62/3.7 |
| 6,080,969 A * | 6/2000 | Goto et al. .................. 219/444.1 |
| 6,230,497 B1 | 5/2001 | Morris et al. .................... 62/3.7 |

OTHER PUBLICATIONS

Ferrotec America Corporation, "*Thermoelectric Modules Reliability Report*", Issue 1, Apr. 2001, pp. 1-12.

* cited by examiner

*Primary Examiner* — Melvin Jones
(74) *Attorney, Agent, or Firm* — Christensen O'Connor Johnson Kindness PLLC

(57) ABSTRACT

A temperature calibration device uses Peltier cells for heating and cooling. The Peltier cells are connected to a relay that connects the cells to each other in one configuration for heating and a different configuration for cooling. The Peltier cells also receive supply voltages having different magnitudes and polarities for heating and cooling. By changing the manner in which the Peltier cells are connected to each other and using different supply voltages for heating and cooling, the cells are able to operate closer to their specified maximum temperature differential without sacrificing the useful life of the cells.

19 Claims, 7 Drawing Sheets

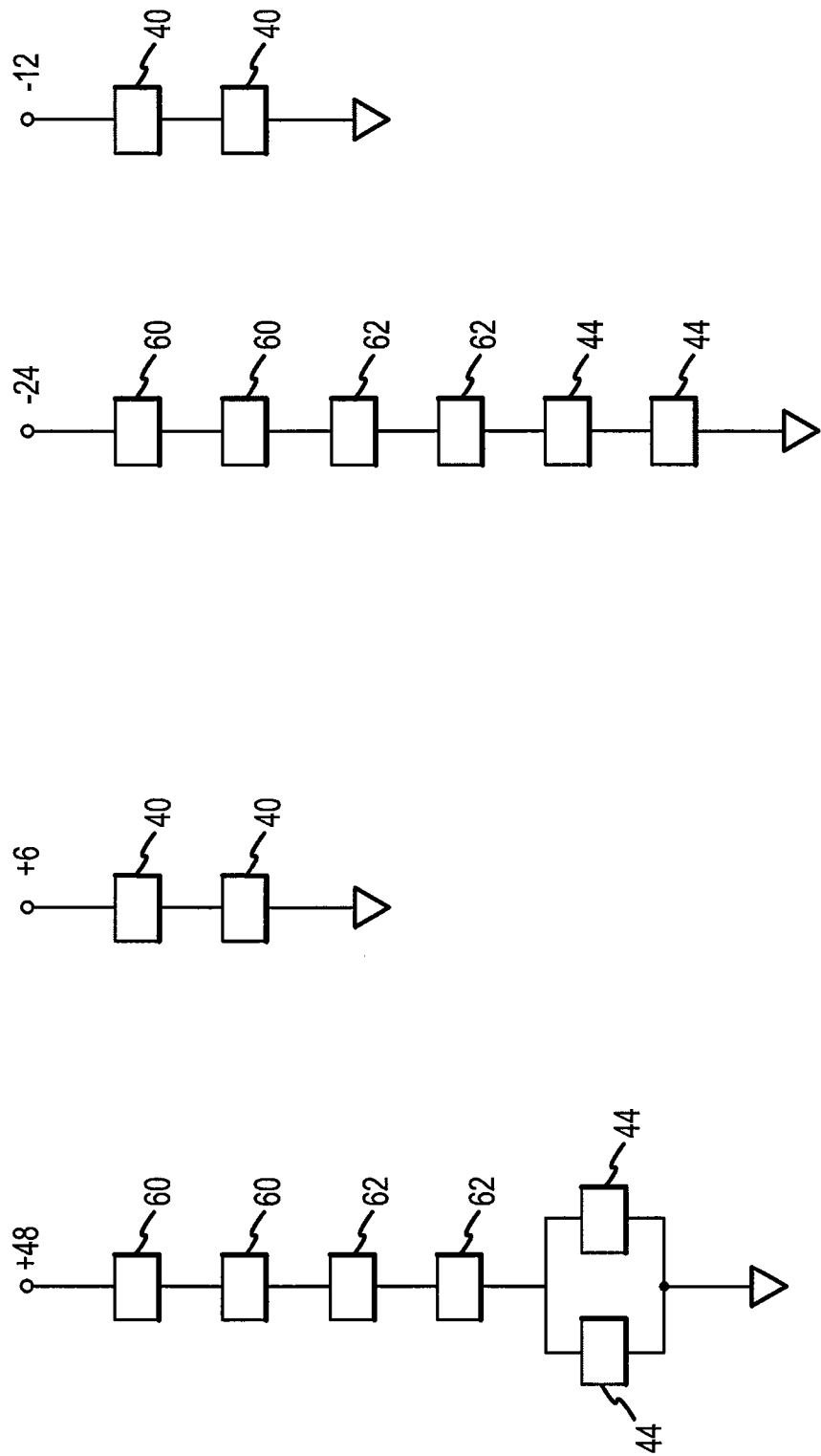

TEMPERATURE CALIBRATION DEVICE HAVING RECONFIGURABLE HEATING/COOLING MODULES TO PROVIDE WIDE TEMPERATURE RANGE

CROSS-REFERENCE TO RELATED APPLICATION

This application is a continuation of U.S. patent application Ser. No. 11/453,713 filed Jun. 14, 2006, U.S. Pat. No. 7,607,309. This application is incorporated by reference herein in its entirety and for all purposes.

TECHNICAL FIELD

This invention relates to electrically powered devices, and, more particularly, to temperature calibration devices using Peltier cells to provide heating and cooling.

BACKGROUND OF THE INVENTION

A wide variety of electrically powered heating devices are in existence to provide a wide variety of functions. For example, temperature calibration devices, known as dry well calibrators, are commonly used in industry to calibrate precision temperature probes.

Conventional dry well calibrators use thermoelectric heating/cooling modules generally containing Peltier cells to heat or cool the calibration probes to temperatures that can be set by a user. Electrical power having one polarity is applied between the first and second substrates of the Peltier cells to cause the temperature of the first substrate to rise relative to the temperature of the second substrate, thereby heating the temperature probe being calibrated. Electrical power having the opposite polarity causes the temperature of the first substrate to fall relative to the temperature of the second substrate, thereby cooling the temperature probe being calibrated.

Peltier cells used in dry well calibrators are usually stacked on top of each other to provide heating and cooling over a range of temperatures that is wider than the temperature differential of each cell. The total temperature differential of a heating/cooling module is substantially equal to the sum of the temperature differentials that can be developed across all of the stacked Peltier cells. The temperature differential that can be developed between the substrates of each Peltier cell is limited to a specified maximum temperature. Therefore, the limiting factor in the operating range of a dry well calibrator is the maximum specified temperature differential of the Peltier cells used in the dry well calibrator. This limiting effect on the operating range of dry well calibrators is exacerbated by the unequal heating of the Peltier cells. Specifically, the temperature differential of Peltier cells in the outside of a stack tend to be greater than the temperature differential of cells that are located toward the inside of the stack. To limit the temperature differential of the cells at the outside of the stack to the specified maximum temperature differential, the other cells in the stack are usually well below the maximum specified temperature differential. Therefore, the maximum operating range of dry well calibrators is typically much smaller than the maximum range that would be possible if all of the Peltier cells in a stack had the same temperature differential.

The need for dry well calibrators to operate over wide temperature ranges frequently requires that the Peltier cells used in the calibrators be operated at or near their maximum specified temperature differential. Unfortunately, operation of the Peltier cells at or near their maximum specified temperature differentials can severely limit the useful life of the cells. Frequent replacement of the Peltier cells can be very expensive, not only because of the cost of the cells, but also because of the cost of labor required to disassemble dry well calibrators to replace the cells and the downtime cost during such replacement. As a result, there is an inevitable tradeoff between achieving a wide operating range for dry well calibrators and achieving reliable performance.

There is therefore a need for a dry well calibrator using Peltier cells that can operate over a wide range of temperatures without unduly limiting the useful life of the Peltier cells.

SUMMARY OF THE INVENTION

A temperature calibration device includes a block of thermally conductive material that is placed in thermal communication with a device to be calibrated. The block is in thermal contact with a plurality of Peltier cells that are connected to a configurable connection device, which may be a relay. The configurable connection device connects the Peltier cells to each other in a first configuration responsive to a first control signal, and it connects the Peltier cells to each other in a second configuration that is different from the first configuration responsive to a second control signal. A power supply applies to the Peltier cells a first voltage responsive to the first control signal and a second voltage responsive to the second control signal. The second voltage has a polarity that is different from the polarity of the first voltage, and it may also have a magnitude that is different from the magnitude of the first voltage. A control circuit is used to generate the first and second control signals. The control circuit generates the first control signal when the device to be calibrated is to be cooled, and it generates the second control signal when the device to be calibrated is to be heated. Therefore, the Peltier cells are connected to each other in different configurations for heating and cooling, and the cells may receive voltages having different magnitudes for heating and cooling.

BRIEF DESCRIPTION OF THE DRAWINGS

FIG. 6 is a block diagram showing the manner in which the system of FIG. 5 connects the Peltier cells to each other when the temperature calibration device is to be used to cool a device to be calibrated.

FIG. 7 is a block diagram showing the manner in which the system of FIG. 5 connects the Peltier cells to each other when the temperature calibration device is to be used to heat a device to be calibrated.

DETAILED DESCRIPTION

Embodiments of the present invention are directed to a system and method for allowing a dry well calibrator to operate over a wide range of temperatures without adversely affecting the service life of Peltier cells used in the calibration device. Certain details are set forth below to provide a sufficient understanding of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
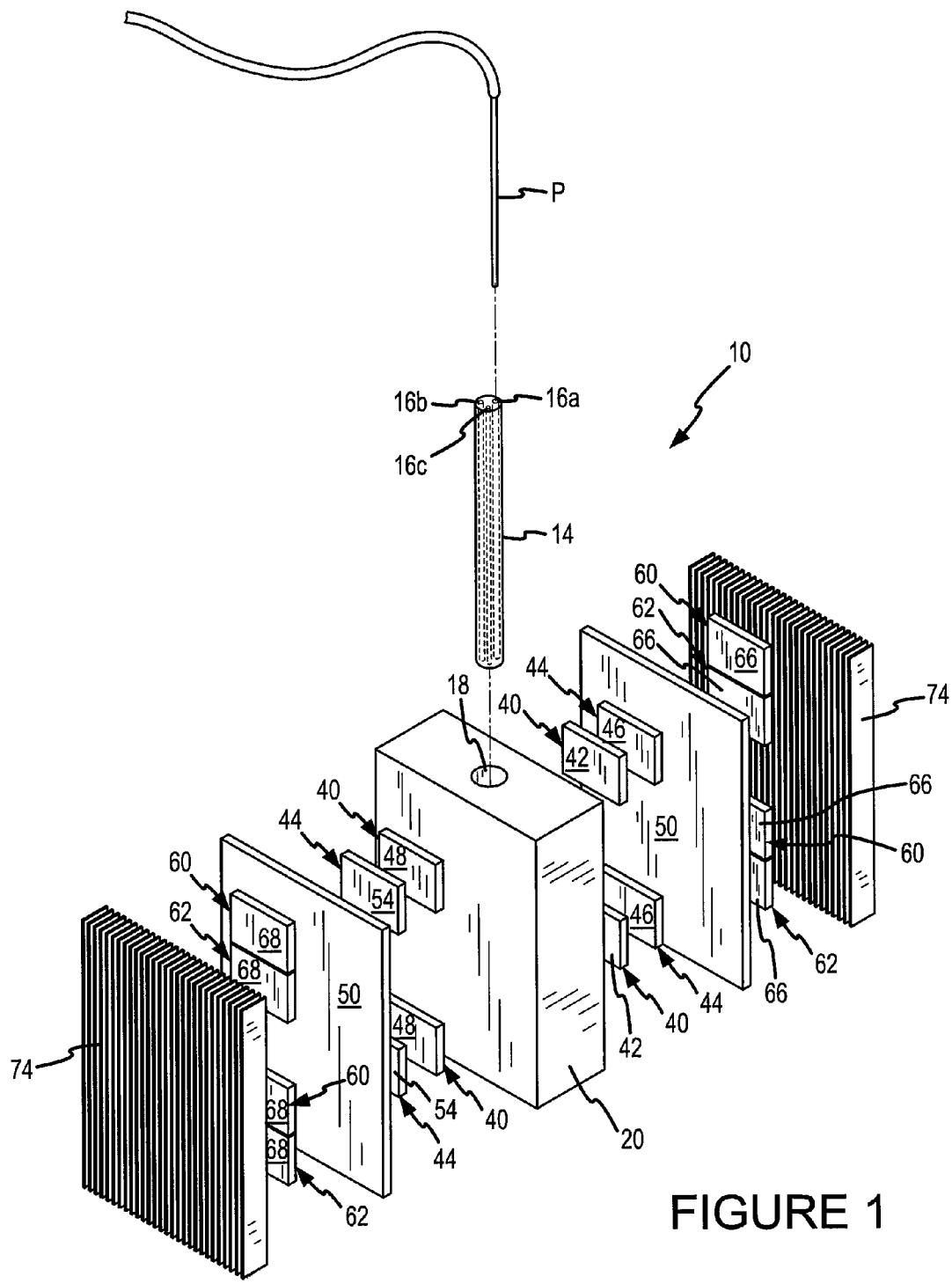
FIG. 1 is an exploded isometric view of some of the internal components of a temperature calibration device according to one example of the invention.

The internal components of a heating block assembly for a typical dry well calibrator 10 are shown in FIG. 1. The dry well calibrator 10 includes a cylindrical insert 14 having one or more cylindrical bores 16a,b,c sized to receive temperature probes "P" having corresponding dimensions. The insert 14 is typically manufactured from a thermally conductive metal. The insert 14 fits into a cylindrical bore 18 formed in a heated/cooled block 20 of a suitable material, such as a metal with good thermal conduction properties. The block 20 has a configuration that is rectangular in both vertical and horizontal cross-section. The inside diameter of the bore 18 is only slightly larger than the outside diameter of the insert 14 to ensure good heat conduction from the block 20 to the insert 14.

Figure 2:
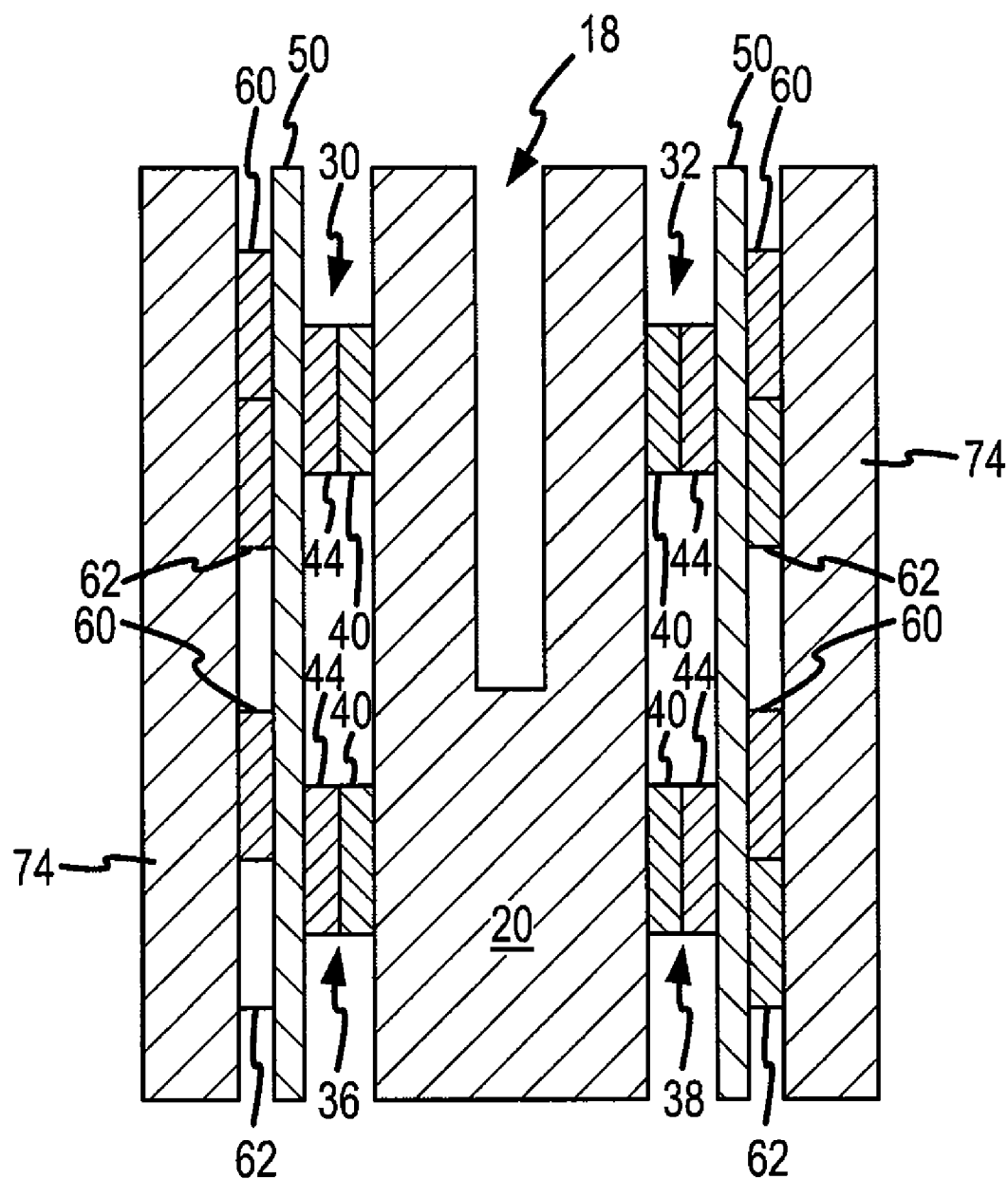
FIG. 2 is a cross-sectional view of the internal components of the temperature calibration device shown in FIG. 1.

With reference also to FIG. 2, a pair of upper thermoelectric heating/cooling modules 30, 32 and a pair of lower thermoelectric heating/cooling modules 36, 38 are bonded to opposite surfaces of the block 20. Each of the thermoelectric heating/cooling modules 30-38 includes a first Peltier cell 40 having an inner substrate 42 (FIG. 1) bonded to the block 20. A second Peltier cell 44 has an inner substrate 46 (FIG. 1) that is bonded to an outer substrate 48 (FIG. 1) of the first cell 40. Temperature conductive plates 50 are bonded to outer substrates 54 (FIG. 1) of the second cells 44. A pair of Peltier cells 60, 62 each having inner and outer substrates 66, 68, respectively, (FIG. 1) have their inner substrates 66 bonded to an outer surface of the plates 50. The Peltier cells 60, 62 are positioned so that their abutting edges overlie the centers of the first and second Peltier cells 40, 44. Finally, conductive leads (not shown) supply electrical power to the Peltier cells 40, 44, 60, 62. As is well-known in the art, electrical power having one polarity causes the temperature of the inner substrates to rise relative to the temperature of the outer substrates thereby heating the block 20. Electrical power having the opposite polarity causes the temperature of the inner substrates to fall relative to the temperature of the outer substrates, thereby cooling the block 20. When the Peltier cells 40, 44, 60, 62 are used for either heating or cooling, the resulting temperature changes imparted to the outer surfaces 68 of the Peltier cells are moderated by heat sinks 74 abutting the outer substrates 68 (FIG. 1) of the cells 60, 62.

Figure 3:
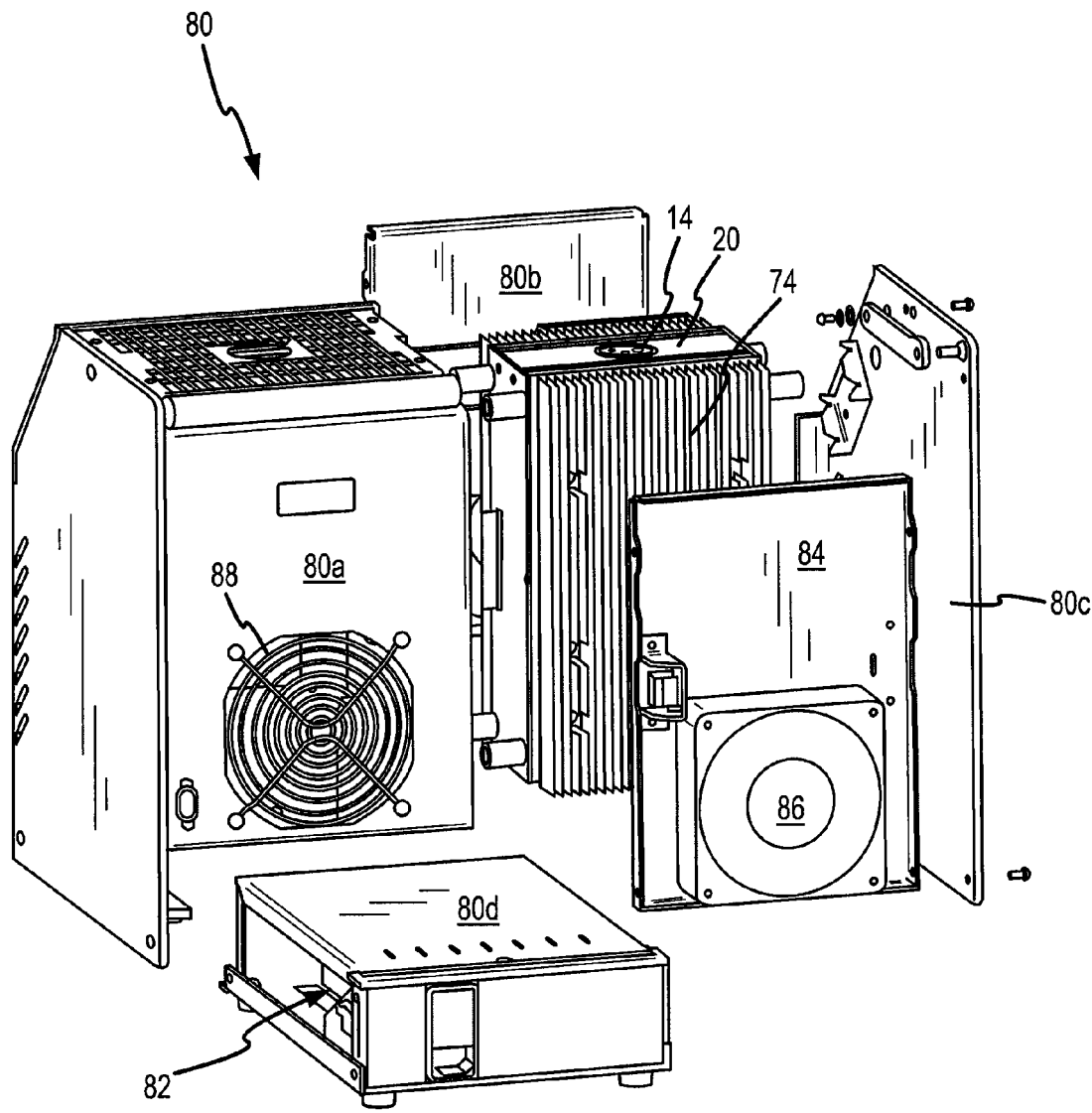
FIG. 3 is an exploded isometric view of a case surrounding the internal components of the temperature calibration device shown in FIG. 1.

With reference also to FIG. 3, the above-described components of the dry well calibrator 10 are surrounded by an outer case 80 formed by case sections 80a,b,c,d. The case section 80d contains control circuitry 82 that is connected to the Peltier cells 40, 44, 60, 62 for controlling the supply of power to the cells. Two fan assembly modules 84 containing a fan 86 are positioned inside the case section 80a so that the fan 86 is behind a grill 88. The case 80 is separated from the heat sinks 74 by a space, and the fan 86 provides airflow through this space to remove heat from or supply heat to the heat sinks 74.

Figure 4:
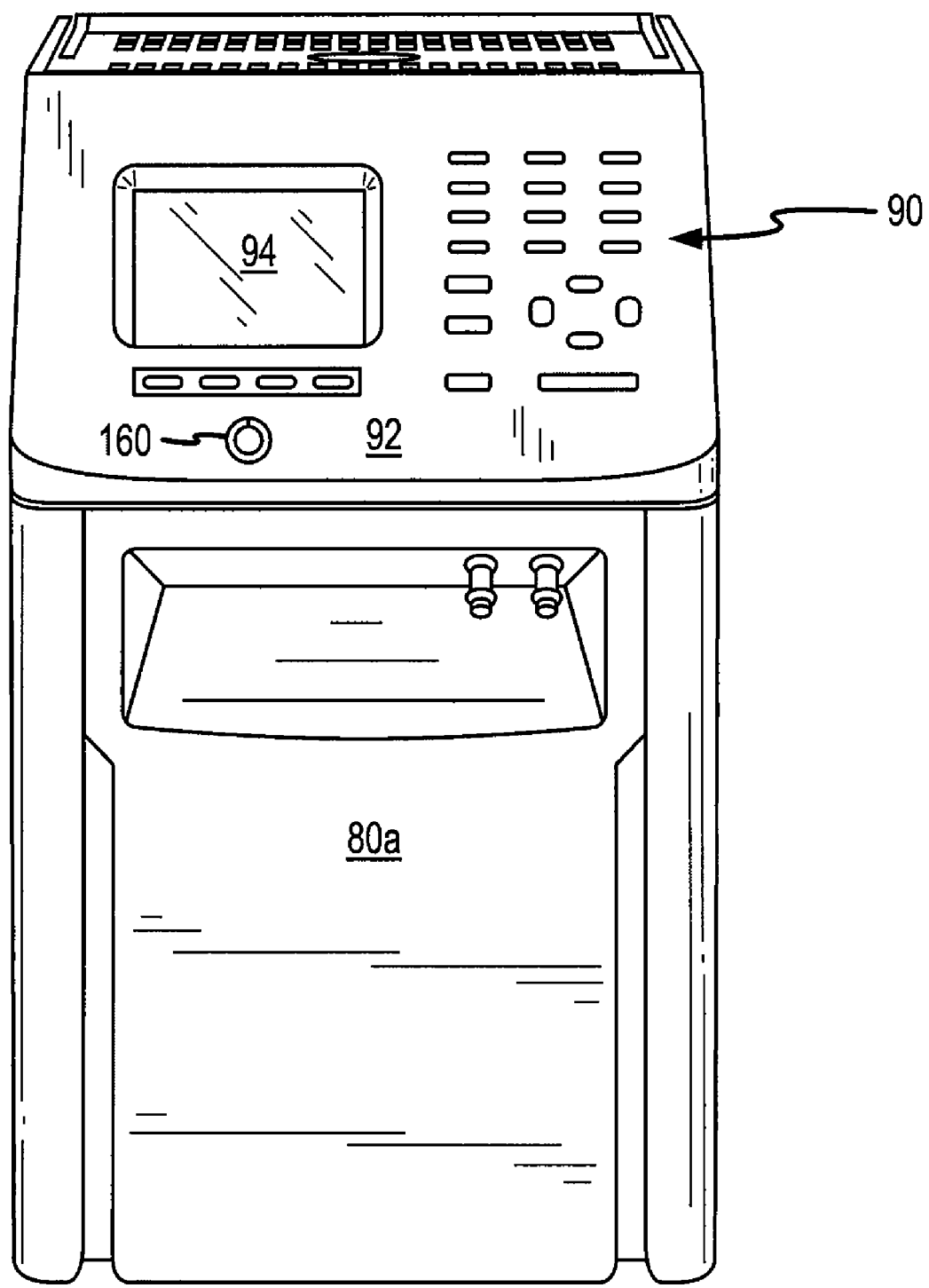
FIG. 4 is a front elevational view of the temperature calibration device of FIG. 1.

As best shown in FIG. 4, a keypad 90 mounted on a panel 92 of the case section 80a is connected to the control circuitry 82 in the case section 80d (FIG. 3) to control the operation of the dry well calibrator 10. A display 94, which is also connected to the control circuitry 82 in the case section 80d (FIG. 3), provides information about the operation of the dry well calibrator 10, such as the temperature of the block 20.

In operation, the keypad 90 (FIG. 4) is used to set the temperature of the block 20 as well as the rate at which the temperature of the block 20 is changed to reach the set temperature. If the temperature set by the keypad 90 is for a temperature above ambient temperature, power having a first polarity is applied to wires that are connected to the Peltier cells 40, 44, 60, 62, thereby causing the cells to cool the block 20. If the temperature set by the keypad 90 is for a temperature below ambient temperature, power having a first polarity is applied to wires that are connected to the Peltier cells 40, 44, 60, 62 to cause the cells to cool the block 20. Once the temperature of the block 20 has stabilized, the temperature probe P (FIG. 1) is inserted into a corresponding sized bore 16 of the insert 14. The probe P is then calibrated by ensuring that a readout device (not shown) connected to the probe P indicates the temperature of the probe P is equal to the set temperature of the dry well calibrator 10.

As explained above, the operating range of the dry well calibrator 10 is limited by the maximum specified temperature differentials of the Peltier cells 40, 44, 60, 62 and the unequal heating of the Peltier cells 40, 44, 60, 62. Balancing the temperature differentials of the Peltier cells 40, 44, 60, 62 allows the dry well calibrator 10 to operate over a wide temperature range without the temperature differential of any of the cells 40, 44, 60, 62 approaching the maximum specified temperature differential. It has been discovered that the temperature differentials of the Peltier cells 40, 44, 60, 62 can be equalized by driving the cells 40, 44, 60, 62 differently for cooling purposes than they are driven for heating purposes. In particular, the excessive temperature differential of the center Peltier cells 44 compared to the temperature differential of the other cells 40, 60, 62 is more of a problem when the Peltier cells 40, 44, 60, 62 are used for heating the block 20 than it is when they are used for cooling the block 20.

Figure 5:
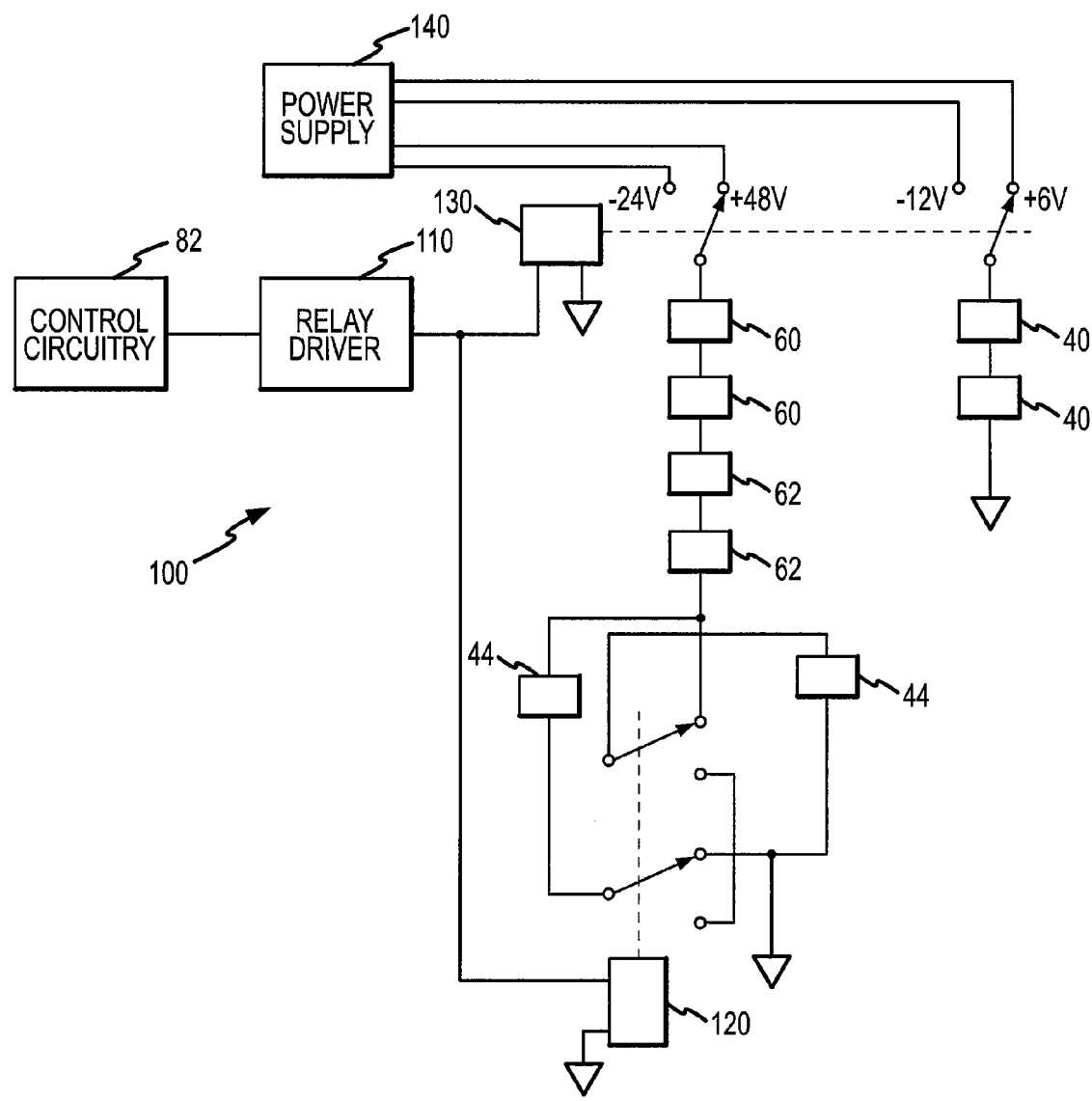
FIG. 5 is a block diagram of a system for driving Peltier cells in the temperature calibration device of FIGS. 1-4 according to one example of the invention.

One embodiment of a system 100 for driving the Peltier cells 40, 44, 60, 62 in the upper heating/cooling modules 30, 32 in a more balanced manner is shown in FIG. 5. A second system that is identical to the system 100 is used for driving the Peltier cells 40, 44, 60, 62 in the bottom heating/cooling modules 36, 38. The system 100 includes a relay driver 110 that receives a control signal H/C* signal from the control circuitry 82 (FIG. 3). Also included in the system are a relay 120 for reconfiguring the connections between the Peltier cells 44, 60, 62, and a relay 130 for applying voltages from a power supply 140 to the Peltier cells 40, 44, 60, 62. More specifically, the relay 130 applies a cooling voltage of +48 volts to the Peltier cells 44, 60, 62 and a cooling voltage of +6 volts to the Peltier cells 40. The relay 130 applies a heating voltage of −24 volts to the Peltier cells 44, 60, 62 and a heating voltage of −12 volts to the Peltier cells 40. The relays 120, 130 are both driven by a signal from the relay driver 110.

When the control circuitry 82 applies a low H/C* signal to the relay driver 110 to cool the block 20, the relay 120 connects the Peltier cells 44, 60, 62 as shown in FIG. 6. In this configuration, the middle Peltier cells 44 are connected in parallel with each other, and this parallel combination is connected in series with the Peltier cells 60, 62. When the H/C* signal is low, the relay 130 applies +48 volts to this combination of the Peltier cells 44, 60, 62, and it applies +6 volts to the series combination of the inner Peltier cells 40.

When the control circuitry 82 applies a high H/C* signal to the relay driver 100 to heat the block 20, the relay connects the Peltier cells 44, 60, 62 as shown in FIG. 7. In this configuration, the middle Peltier cells 44 are connected in series with the Peltier cells 60, 62. When the H/C* signal is high, the relay 130 applies −24 volts to this combination of the Peltier cells 44, 60, 62, and it applies −6 volts to the series combination of the inner Peltier cells 40.

Assuming each of the Peltier cells 40, 44, 60, 62 have a resistance of R, the total current drawn by the Peltier cells 44, 60, 62 when they are configured for cooling as shown in FIG. 6 is +48/4.5R, which is equal to +10.67/R. Therefore, the current drawn by the Peltier cells 44 is half that current, or +5.33/R. The total current drawn by the Peltier cells 40 is +6/2R, which is equal to +3/R. In this cooling configuration, the current through and the power dissipated by each of the Peltier cells 40, 44, 60, 62 is as shown in Table 1, below. The current drawn by the Peltier cells 44, 60, 62 when they are configured for heating as shown in FIG. 7 is −24/6R, which is equal to −4/R. The current drawn by the Peltier cells 40 is −12/2R, which is equal to −6/R. The current through and the power dissipated by each of the Peltier cells 40, 44, 60, 62 is also shown in Table 1, below.

TABLE 1

| Cell | Heating Current | Cooling Current | Heating Power | Cooling Power |
|---|---|---|---|---|
| 40 | −6/R | +3/R | 36/R | 9/R |
| 44 | −4/R | +5.33/R | 16/R | 28.44/R |
| 60, 62 | −4/R | +10.67/R | 16/R | 113.77/R |

As can be seen from Table 1, the Peltier cells 40 dissipate more power for heating than they do for cooling, but the Peltier cells 44 dissipate less power for heating than they do for cooling, and the Peltier cells 60, 62 dissipate much less power for heating than they do for cooling. Further, for cooling, the power dissipated by the Peltier cells 40, 44, 60, 62 increases from the inner Peltier cell 40 to the outer Peltier cells 60, 62, but, for heating, decreases from the inner Peltier cell 40 to the outer Peltier cells 60, 62. Therefore, in both heating and cooling, the power dissipated by the Peltier cells 40, 44, 60, 62 increases from the cooled surface to the heated surface.

Figure 8:
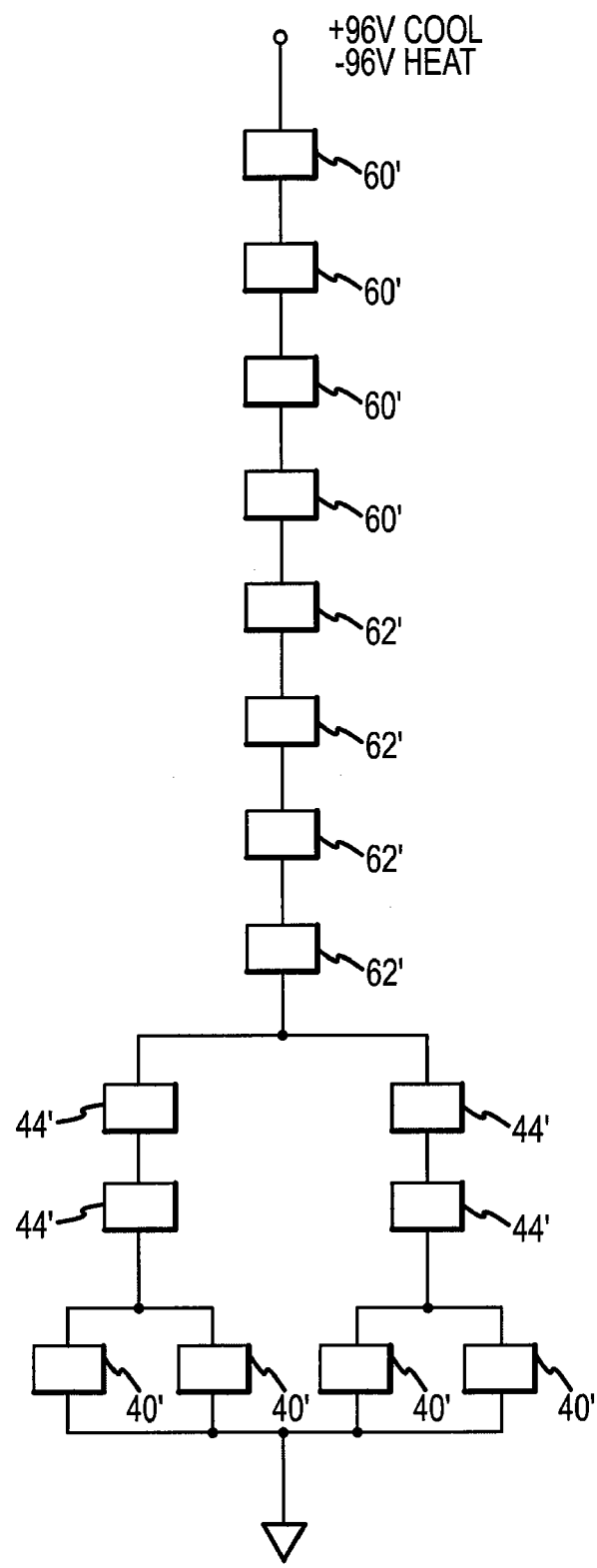
FIG. 8 is a block diagram showing the manner in which Peltier cells are connected to each in a prior art temperature calibration device.

In contrast, prior art dry well calibrators use Peltier cells that are connected to each other is shown in FIG. 8, in which the Peltier cells 40', 44', 60', 62' correspond to the Peltier cells 40, 44, 60, 62 shown in FIGS. 1-7 for both the upper thermoelectric heating/cooling modules 30, 32 and the lower thermoelectric heating/cooling modules 36, 38. In the prior art configuration of the Peltier cells 40', 44', 60', 62', the configuration of the Peltier cells 40', 44', 60', 62' is the same for both heating and cooling. Also, the ±96 volt power applied to the Peltier cells 40', 44', 60', 62' has the same magnitude for both heating and cooling so that the current through and power dissipated by the cells is the same for both heating and cooling. The current through the Peltier cells 40', 44', and 60', 62' is 2.74/R, 5.49/R and 10.07/R, respectively. Therefore, the current through and power dissipated by the Peltier cells 40', 44', 60', 62' in one prior art dry well calibrator is similar to the current through and power dissipated by the Peltier cells 40, 44, 60, 62 for cooling but quite different from the current through and power dissipated by the Peltier cells 40, 44, 60, 62 for heating. By allowing the Peltier cells 40, 44, 60, 62 to be reconfigured for heating and cooling and/or by applying voltage having different magnitudes to the Peltier cells 40, 44, 60, 62 for heating and cooling, the operating range of the dry well calibrator 10 can be maximized without operating the Peltier cells 40, 44, 60, 62 at or beyond their maximum specified temperature differential. As a result, the dry well calibrator 10 can operate over a large range of temperatures without sacrificing reliability.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

We claim:

1. A method of cooling and heating a device, the method comprising:
   connecting a plurality of Peltier cells to each other in a first configuration;
   applying a first voltage having a first polarity to the Peltier cells that are in the first configuration to cool the device;
   connecting the plurality of Peltier cells to each other in a second configuration, the second configuration being different from the first configuration; and
   applying a second voltage having a second polarity to the Peltier cells that are in the second configuration to heat the device.

2. The method of claim 1 wherein a first magnitude of the first voltage is different from a second magnitude of the second voltage.

3. The method of claim 1 wherein a current flows through at least a first of the Peltier cells responsive to the first voltage when the Peltier cells are in the first configuration, the current having as first magnitude that is different from a second magnitude of a current flowing through the first of the Peltier cells responsive to the second voltage when the Peltier cells are in the second configuration.

4. The method of claim 1 wherein the act of connecting the plurality of Peltier cells to each other in a first configuration comprises connecting at least two of the Peltier cells in parallel with each other in the first configuration.

5. The method of claim 4 wherein the act of connecting the plurality of Peltier cells to each other in as first configuration comprises connecting at least two of the Peltier cells in series with the at least two Peltier cells in parallel with each other.

6. The method of claim 1 wherein the act of connecting the plurality of Peltier cells to each other in a second configuration comprises connecting all of the Peltier cells in series with each other in the second configuration.

7. The method of claim 1 wherein the act of connecting the plurality of Peltier cells to each other in a first configuration comprises:
   connecting some of the Peltier cells to each other in a third configuration, the first voltage being applied to the Peltier cells in the third configuration; and
   connecting the remaining Peltier cells to each other in a fourth configuration, a third voltage being applied to the Peltier cells in the fourth configuration.

8. The method of claim 7 wherein the Peltier cells in the fourth configuration are isolated front the Peltier cells that are in the third configuration.

9. The method of claim 1 wherein at least some of the Peltier cells in the first and second configurations are stacked on each other.

10. A device, comprising:
   a thermally conductive device;
   a plurality of Peltier cells in thermal contact with the thermally conductive device;
   a configurable connection device coupled to the Peltier cells, the configurable connection device being structured to connect the Peltier cells to each other in a first configuration responsive to a first control signal and to connect the Peltier cells to each other in a second configuration responsive to a second control signal, the second configuration being different from the first configuration;

a power supply structured to apply as first voltage to the Peltier cells responsive to the first control signal and to apply a second voltage to the Peltier cells responsive to the second control signal, the second voltage having a polarity that is different from the polarity of the first voltage; and a control circuit coupled to the configurable connection device and the power supply, the control circuit being structured to apply the first control signal to the configurable connection device and the power supply when the thermally conductive device is to be cooled and to apply the second control signal to the configurable connection device and the power supply when the thermally conductive device is to be heated.

11. The device of claim 10 wherein the configurable connection device comprises a relay.

12. The device of claim 10 wherein the plurality of Peltier cells are placed on each other in at least one stack of Peltier cells having an inner Peltier cell placed on the thermally conductive device, a middle Peltier cell placed on the inner Peltier cell, and an outer Pettier cell placed on the middle Peltier cell.

13. The device of claim 12 wherein a first stack of the Peltier cells are placed on a first side of the thermally conductive device and a second stack of the Peltier cells are placed on a second side of the thermally conductive device.

14. The device of claim 13 wherein the first configuration of the Peltier cells comprises:
a parallel combination of the middle Peltier cells;
a series combination of the inner Peltier cells and the parallel combination of the middle Peltier cells; and
a series combination of the inner Peltier cells.

15. The device of claim 14 wherein the power supply is operable responsive to the first control signal to apply the first voltage to the series combination of the inner Peltier cells and the parallel combination of the middle Peltier cells, and the power supply is operable responsive to the first control signal to apply a third voltage to the series combination of the inner Peltier cells.

16. The device of claim 10 wherein the power supply comprises a relay having a first contact receiving the first voltage, a second contact receiving the second voltage and a third contact connected to the Peltier cells, the relay being operable to connect the first contact to the third contact responsive to the first control signal, and to connect the second contact to the third contact responsive to the second control signal.

17. The device of claim 10 wherein first voltage has a magnitude that is different from a magnitude of the second voltage.

18. A device, comprising:
a block of thermally conductive material;
a plurality of Peltier cells in thermal contact with the block of thermally conductive material;
a power supply structured to apply a first voltage to the Peltier cells responsive to a first control signal and to apply a second voltage to the Peltier cells responsive to a second control signal, the second voltage having a magnitude and polarity that is different from the first voltage; and
a control circuit coupled to the power supply, the control circuit being structured to apply the first control signal to the power supply when the block of thermally conductive material is to be cooled and to apply the second control signal to the power supply when the block of thermally conductive material is to be heated.

19. The device of claim 18 wherein the power supply comprises a relay having a first contact receiving the first voltage, a second contact receiving the second voltage and a third contact connected to the Peltier cells, the relay being operable to connect the first contact to the third contact responsive to the first control signal, and to connect the second contact to the third contact responsive to the second control signal.

\* \* \* \* \*

UNITED STATES PATENT AND TRADEMARK OFFICE
CERTIFICATE OF CORRECTION

PATENT NO. : 8,117,848 B2  
APPLICATION NO. : 12/606023  
DATED : February 21, 2012  
INVENTOR(S) : F. E. Liebmann et al.

Page 1 of 1

It is certified that error appears in the above-identified patent and that said Letters Patent is hereby corrected as shown below:

| COLUMN | LINE | ERROR |
|---|---|---|
| 6 (Claim 3, line 4) | 30 | "as" should read --a-- |
| 6 (Claim 5, line 2) | 39 | "as" should read --a-- |
| 6 (Claim 8, line 2) | 55 | "front" should read --from-- |
| 7 (Claim 10, line 13) | 6 | "as" should read --a-- |

Signed and Sealed this  
Nineteenth Day of February, 2013

Teresa Stanek Rea  
*Acting Director of the United States Patent and Trademark Office*